United States Patent [19]

Kuroda

[11] 4,236,619
[45] Dec. 2, 1980

[54] ONE-WAY CLUTCH

[75] Inventor: Masao Kuroda, Mie, Japan

[73] Assignee: NTN Toyo Bearing Company, Limited, Osaka, Japan

[21] Appl. No.: 954,595

[22] Filed: Oct. 25, 1978

[30] Foreign Application Priority Data

Oct. 26, 1977 [JP] Japan .............................. 52-144345

[51] Int. Cl.³ ............................................ F16D 41/06
[52] U.S. Cl. ...................................................... 192/45
[58] Field of Search ................... 192/44, 45; 188/82.84

[56] References Cited

U.S. PATENT DOCUMENTS

| 2,505,794 | 5/1950 | Schofield | 192/45 |
| 3,012,645 | 12/1961 | Gensheimer et al. | 192/45 |
| 3,194,368 | 7/1965 | Benson et al. | 192/45 |
| 3,732,957 | 5/1973 | McEwen | 192/45 |
| 3,990,555 | 11/1976 | Carullo | 192/45 |

FOREIGN PATENT DOCUMENTS

| 2225394 | 5/1972 | Fed. Rep. of Germany | 192/45 |
| 782016 | 3/1935 | France | 192/45 |

Primary Examiner—Allan D. Herrmann
Attorney, Agent, or Firm—Armstrong, Nikaido, Marmelstein & Kubovcik

[57] ABSTRACT

A one-way clutch comprises rollers disposed respectively in a plurality of wedge-shaped spaces defined between an outer ring provided with a plurality of clutch slopes on its inner peripheral surface and the cylindrical outer peripheral surface of a shaft or inner ring, S-shaped spring members lightly pressing the rollers against the wedge surfaces, and bearing rings installed between the outer ring and the shaft or inner ring and on opposite sides of the rollers.

8 Claims, 6 Drawing Figures

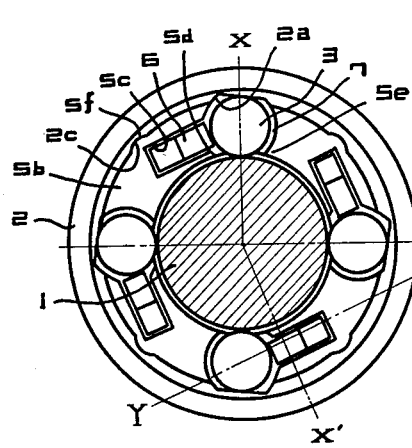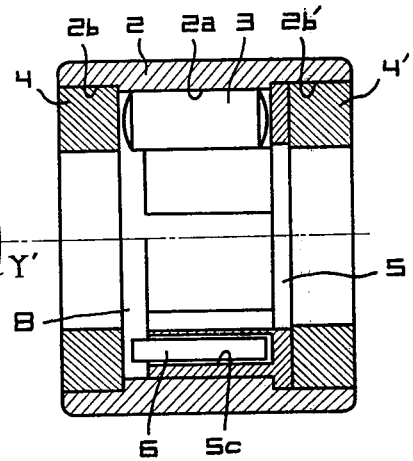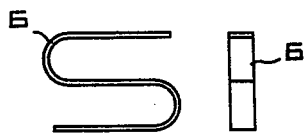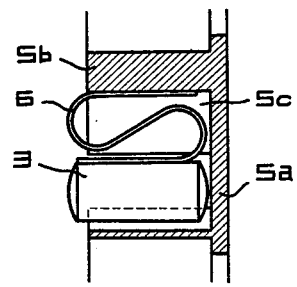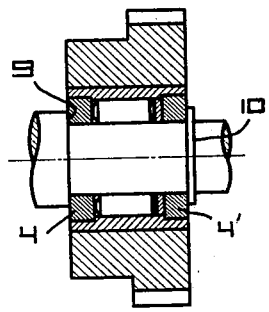

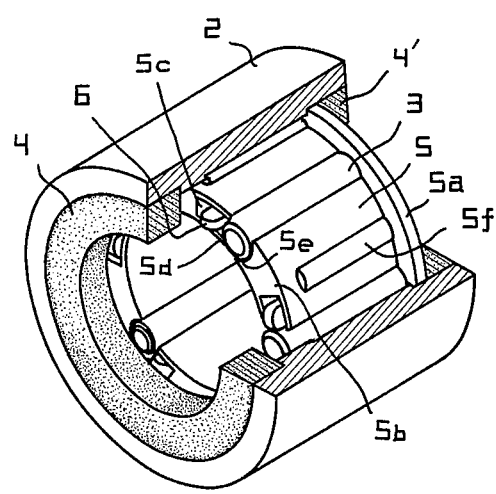
Fig_6

ONE-WAY CLUTCH

BACKGROUND OF THE INVENTION (a) Field of the Invention

The present invention relates to a one-way clutch having the function of a bearing.

(b) Description of the Prior Art

There has been known and widely used a one-way clutch of the type in which rollers are disposed respectively in a plurality of wedge-like spaces defined between an outer ring provided with clutch slopes on its inner peripheral surface and the cylindrical outer peripheral surface of a shaft or inner ring, said rollers being lightly pressed against the wedge surfaces by spring members, the arrangement being such that when the shaft or inner ring and the outer ring are relatively rotated in a certain direction, the rollers are forced into operative engagement with the wedge surfaces by frictional force to perform the function of a clutch and that when they are relatively rotated in the opposite direction, they can be freely rotated.

Generally, the one-way clutch of the type described above cannot support radial loads by itself. In order to perform the function of a bearing, it is usual practice to use a needle roller bearing with the one-way clutch or incorporate a needle roller bearing integrally into the outer ring of the clutch. As for the spring members for circumferentially pressing the rollers against the wedge surfaces, various types have been used but they have merits and demerits.

SUMMARY OF THE INVENTION

The present invention relates to a one-way clutch of the type in which rollers are disposed respectively in a plurality of wedge-shaped spaces defined between an outer ring provided with a plurality of clutch slopes on its inner periphery and the cylindrical outer peripheral surface of a shaft or inner ring, said rollers being lightly pressed against the wedge surfaces by spring members, said one-way clutch being characterized in that said clutch slopes on the inner peripheral surface of the outer ring are located at the middle of the axial dimension of the outer ring, the opposite sides of the outer ring are formed with cylindrical surfaces and bearing rings are fixedly fitted therein, said bearing rings supporting radial loads on their inner peripheries and axial loads on their end surfaces, said bearing rings also serving as sealing plates for preventing the leakage of grease contained in the clutch and the entry of dirt into the clutch, said rollers being circumferentially pressed by spring members retained by a retainer installed in the clutch.

FEATURES OF THE INVENTION

An object of the invention is to provide a one-way clutch having a simple construction and superior performance, wherein the opposed bearing rings have the function of plain bearings for supporting radial loads and the function of sealing plates, and S-shaped springs which can be given a relatively large deflection while requiring a small installation space are built into the columns of a comb-shaped retainer to provide for a stabilized clutch function, thus enabling the clutch to be employed even when the shaft diameter is small.

BRIEF DESCRIPTION OF THE DRAWINGS

FIG. 1 is a front view of an embodiment of the invention, (with bearing rings 4 in FIG. 2 removed);

FIG. 2 is a longitudinal section of FIG. 1, with the shaft removed, the upper half being a section taken along the line O-X, the lower half being a section taken along the line O-X' of FIG. 1;

FIG. 3 shows an S-shaped leaf spring;

FIG. 4 is a section taken along the line Y-Y' of FIG. 1;

FIG. 5 shows a manner of use of a one-way clutch of the invention in which its positioning on a shaft is effected by a stop ring; and FIG. 6 is a perspective view of the one-way clutch of the invention, with the outer ring and bearing rings partly broken away.

DESCRIPTION OF THE PREFERRED EMBODIMENT

In FIGS. 1 and 2, the character 1 designates a shaft (which is removed in FIG. 2); 2 designates a machined type outer ring; 3 designates rollers; 4, 4' designate bearing rings; and 5 designates a retainer for the rollers and spring members. The character 6 designates spring members. Four rollers are shown in these figures, it being noted that the number of rollers which should be not less than 3 will be suitably determined according to the clutch size and the ratio between the shaft diameter and the outer diameter of the outer ring. As shown in FIG. 1, the outer ring is provided with a plurality of slopes 2a on its inner periphery, said slopes cooperating with the outer peripheral surface of the shaft 1 to define wedge-shaped spaces therebetween, in which the rollers 3 are lightly pressed against the wedge surfaces by the spring members 6. In FIG. 1, when the shaft 1 is rotated clockwise relative to the outer ring 2 or when the outer ring is rotated counterclockwise relative to the shaft, the rollers are forced into operative engagement with the wedge surface by frictional force, whereby the shaft and the outer ring are locked together, producing a clutch action. When the direction of relative rotation of the shaft and outer ring is opposite to the previous one, the rollers will not be forced into operative engagement with the wedge surfaces, thus allowing the shaft and outer ring to rotate freely. The construction described above is the same as in roller type one-way clutches in wide use.

The present invention relates to improvements to be described below.

As shown in FIG. 2, the plurality of slopes 2a on the inner periphery of the outer ring are located at the middle of the axial dimension of the outer ring, and the opposite sides of the outer ring are formed with cylindrical surfaces 2b, 2b' and bearing rings 4, 4' are fixedly fitted therein. The inner peripheries of the bearing rings 4, 4' are formed as cylindrical surfaces, with a slight clearance defined between such cylindrical surface and the shaft, thus acting as plain bearings. Generally, a one-way clutch often makes it necessary to employ a separate bearing in order to support radial loads. However, since the one-way clutch according to the invention is adapted to support radial loads by the bearing rings, it can be used by itself, requiring less space. Further, since the plain bearings hold the shaft coaxially with the outer ring, the clutch action is stabilized. In addition, as a manner of use of such one-way clutch, there are cases where the position of the clutch on the shaft must be controlled. In such cases, as shown in FIG. 5, the opposed bearing rings 4, 4' of the one-way clutch of the invention slip on a shoulder 9 on the shaft or a stop ring 10 during idle running, thus performing the function of thrust bearings at their end surfaces. Suitably, the material of the bearing rings is oil-containing sintered alloy or synthetic resin. Further, the bearing rings 4, 4' also serve as sealing plates for preventing the leakage of the lubricant from within the clutch and the entry of dirt into the clutch. Furthermore, in the one-way clutch of the invention, the roller retainer also retains the spring members. What is shown in FIGS. 1 and 2 is an example thereof, wherein the retainer 5 is a comb-shaped retainer comprising an annulus 5a and columns 5b integral therewith. Each spring member 6 is retained in a recess 5c formed in one of the opposed surfaces of adjacent columns. The circumferential spacing between adjacent columns is such as to provide a space 7 necessary for the roller to move in the wedge-shaped space. The ends 5d, 5e of the columns on the inner peripheries serve to prevent the rollers from slipping off when the shaft is not incorporated. The spaces 7 and the space 8 shown in FIG. 2 serve to hold the lubricating grease. In the above example, the spring members have been shown as retained in the recesses of the retainer columns, the retaining method is not limited thereto. As shown in FIG. 1, axially extending ridges 5f are formed on the outer peripheries of the colums, while recesses 2c are provided at the corresponding positions on the outer ring. This arrangement has a double purpose, the circumferential positioning of the retainer when the latter is built into the outer ring, and the prevention of the rotation of the retainer relative to the outer ring during the use of the clutch. In addition, such retainer may be mass-produced at low cost if injection-molded of high molecular substance.

Another feature of the present invention is that S-shaped leaf springs shown in FIG. 3 are used as the spring members 6. Generally, in order for such one-way clutch to provide a stabilized clutch action, it is essential that the spring pressure change little even if the position of the rollers in the wedge-shaped spaces somewhat changes depending upon the degree of accuracy of the shaft diameter. An S-shaped leaf spring such as described above can be given a large deflection while requiring a small installation space, with the spring constant minimized, thus meeting the above requirement. FIG. 4 is a Y-Y' section of FIG. 1 viewed from the outer periphery (with the roller not in section), illustrating the S-shaped leaf spring built into the clutch in a flexed position pressing the roller. In addition, FIGS. 3 and 4 show a basic form of S-shaped leaf spring, it being noted that the shape of the spring may be changed according to the spring retaining construction of the retainer columns.

In the above example, the rollers are located between the shaft and the outer ring. However, an inner ring may be fixed on the shaft for placing the rollers between the inner ring and the outer ring. Further, besides being of machined type, the outer ring may be of shell type.

As has been described so far, a one-way clutch according to the invention comprises bearing rings of oil-containing sintered alloy fixedly fitted in the outer ring at the opposed cylindrical end surfaces of the latter to keep the shaft or inner ring coaxial with the outer ring, the inner peripheries of said bearing rings having the function of plain bearings for supporting axial loads, thus saving the need for providing the clutch with separate bearings. Further, since the bearing rings have the function of thrust bearings at their end surfaces, the clutch can be used in such a way that it is held at a fixed position on the shaft as by a stop ring. The bearing rings also serve to seal the clutch, and the S-shaped leaf springs can be given a relatively large deflection while requiring a small installation space, so that a satisfactory clutch action can be achieved with a stabilized spring pressure. Thus, the clutch is simple in construction, compact and superior in performance and can be mass-produced at low cost.

What is claimed is:

1. A one-way clutch of the type in which rollers are disposed respectively in a plurality of wedge-shaped spaces defined between an outer ring provided with a plurality of clutch slopes on its inner periphery and the cylindrical outer surface of a shaft or inner ring, said rollers being lightly pressed against the wedge surfaces by spring members, the improvement wherein said clutch slopes on the inner peripheral surface of the outer ring are located at an axially central location of the outer ring, the outer ring is formed at its opposite ends with enlarged interior diameter portions with bearing rings being fixedly fitted therein, said bearing rings bearing radial loads on their inner peripheries and axial loads on the end surfaces, said bearing rings also serving as sealing plates for preventing the leakage of grease contained in the clutch and the entry of dirt into the clutch, said rollers being lightly, tangentially pressed against the clutch slopes by the S-shaped spring members so positioned in a retainer installed in the clutch so that their S-shaped projections lie in planes parallel to the longitudinal axes of the respective rollers.

2. A one-way clutch as set forth in claim 1, wherein said bearing rings are made of oil-containing sintered alloy.

3. A one-way clutch as set forth in claim 1, wherein said bearing rings are made of synthetic resin.

4. A one-way clutch as set forth in claim 1 wherein said retainer is of the comb-shaped type comprising an annulus and a plurality of fingers integral with the annulus, each of said spring members being located in a recess formed in each one of opposed surfaces of the adjacent fingers.

5. A one-way clutch as set forth in claim 1 wherein the outer peripheries of said fingers are provided with axially extending ridges adapted to engage recesses formed in the inner periphery of the outer ring.

6. A one-way clutch of the type in which rollers are disposed respectively in a plurality of wedge-shaped spaces defined between an outer ring provided with a plurality of clutch slopes on its inner periphery and the cylindrical outer surface of a shaft or inner ring, said roller being lightly pressed against the wedge surface by spring members, the improvement wherein said clutch slopes on the inner peripheral surface of the outer ring are located at the middle of the axial dimension of the outer ring, the opposite sides of the ring are formed with cylindrical surfaces and bearings are fixedly fitted therein, said bearing rings supporting radial loads on their inner peripheries and axial loads on the end surfaces, said bearing rings also serving as sealing plates for preventing the leakage of grease contained in the clutch and the entry of dirt into the clutch, said rollers being circumferentially pressed by S-shaped spring members retained by a retainer installed in the clutch, said retainer being a comb-shaped retainer comprising an annulus and columns integral therewith, one of the opposed end surfaces of adjacent columns is provided with a recess for retaining said spring member therein, and the outer peripheries of said columns are provided with axially extending ridges adapted to engage recesses formed in the inner periphery of the outer ring.

7. A one-way clutch as set forth in claim 6 wherein said bearing rings are made of oil-containing sintered alloy.

8. A one-way clutch as set forth in claim 6 wherein said bearing rings are made of synthetic resin.